United States Patent [19]

Gibbons

[11] Patent Number: 5,391,033
[45] Date of Patent: Feb. 21, 1995

[54] NUT LOCK

[76] Inventor: Rodney M. Gibbons, 7305 Woodbine Avenue, Unit 345, Markham, Ontario, Canada, L3R 3V7

[21] Appl. No.: 24,331

[22] Filed: Mar. 1, 1993

[51] Int. Cl.⁶ .......................... F16B 35/02; F16B 39/28
[52] U.S. Cl. ..................................... 411/263; 411/383; 411/910; 411/931
[58] Field of Search ............... 411/263, 324, 383, 384, 411/264, 244, 222, 931, 910

[56] References Cited

U.S. PATENT DOCUMENTS

| | | | |
|---|---|---|---|
| 503,195 | 8/1893 | Clark et al. | 411/244 |
| 787,088 | 4/1905 | Earhart . | |
| 831,009 | 9/1906 | Knopf . | |
| 857,526 | 6/1907 | Kopf . | |
| 894,041 | 7/1908 | Norris . | |
| 932,398 | 8/1909 | Kenney . | |
| 1,467,324 | 9/1923 | Ahlers . | |
| 1,576,413 | 3/1926 | Cubitt | 411/263 |
| 2,696,236 | 12/1954 | Curran . | |
| 4,840,529 | 6/1989 | Phillips . | |
| 5,071,300 | 12/1991 | McCauley | 411/910 X |

FOREIGN PATENT DOCUMENTS 2066401 7/1981 United Kingdom ................ 411/383

Primary Examiner—Neill R. Wilson
Attorney, Agent, or Firm—Arne I. Fors; Jeffrey T. Imai

[57] ABSTRACT

A tamper-proof, self activating nut lock apparatus comprises a threaded shank having an external screw thread of a first pitch and a coaxial threaded bore at one end of the threaded shank, with an internal screw thread of a second pitch, both the said external and internal screw threads having a same direction of rotation. A shank extension having the external pitch of the first pitch and a coaxial threaded projection of the second pitch is screwed into the threaded bore of the shank and a threaded nut is adapted to engage the external threads of the shank and the shank extension. A friction means, such as a nylon insert, is adapted to engage the shank extension and the threaded nut whereby reverse rotation of the nut to remove the nut from the shank without appropriate tools rotates the shank extension for jamming the nut on the threaded shank to prevent removal of the nut.

5 Claims, 3 Drawing Sheets

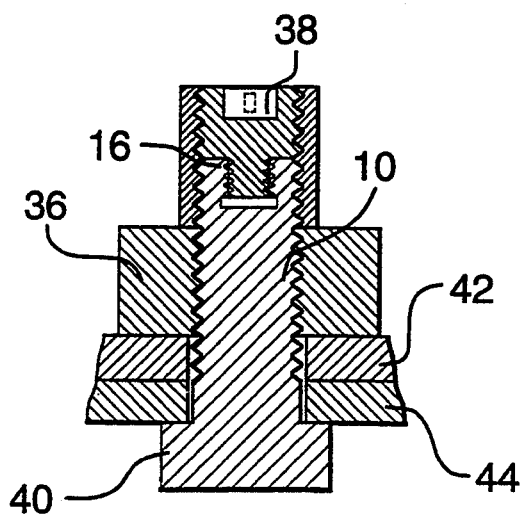 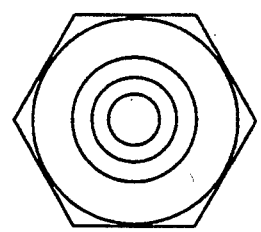
FIG.3      FIG.3A
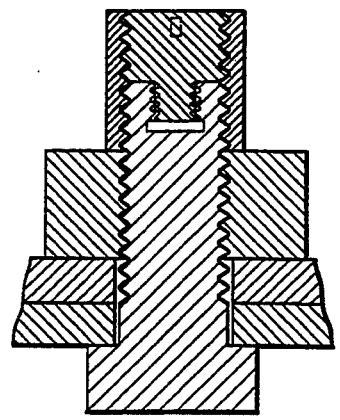 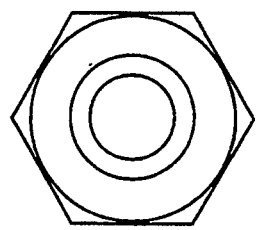
FIG.5      FIG.5A
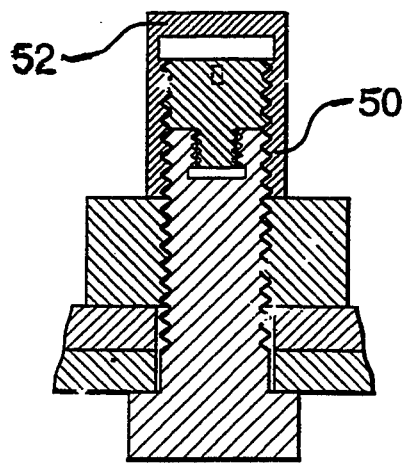 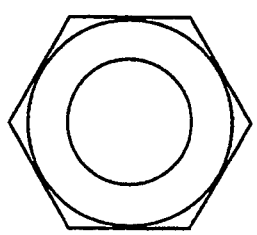
FIG.6      FIG.6A

NUT LOCK

BACKGROUND OF THE INVENTION

The present invention relates to a nut locking device to prevent unwanted or unauthorized removal of threaded nuts and, more particularly, relates to a nut locking apparatus which is self activating and may lock permanently if desired.

Nut locking mechanisms are known but all prior art disclosures use a combination of right and left hand threads, such as U.S. Pat. No. 787,088 which has a bore in the structural bolt having a reverse thread. After a nut is secured on the structural bolt, a small bolt having reverse threads is inserted into the end of the main bolt to lock the nut in place. The nut should not vibrate free but may easily be removed even without knowledge of the mechanism. U.S. Pat. Nos. 831,009, 857,526, 894,041, 932,398, 1,467,824, 2,696,236 and 4,840,529 are typical of such mechanisms.

It is a principal object of this invention to provide an improved nut locking apparatus for threaded nuts, which is simple to manufacture and use, employing only threads of one direction of rotation.

It is also an object of this invention to provide a nut locking apparatus which is self activating and may be modified to allow different levels of difficulty of removal.

SUMMARY OF THE INVENTION

In accordance with the apparatus of the present invention, the problem of unauthorized removal of threaded nuts is substantially eliminated, improving the security and integrity of structural members such as electrical transmission or communication towers and light standards.

In its broad aspect, the tamper-proof nut locking device of the invention comprises a threaded shank having an external screw thread of a first pitch and a threaded bore at one end of the threaded shank, coaxial with the external screw thread, having an internal screw thread of a second pitch, both the said external screw thread and the internal screw thread having a same direction of rotation, a shank extension having an external pitch of the first pitch and a threaded projection coaxial therewith of the second pitch adapted to engage the screw threaded bore of the shank, a threaded nut adapted to engage the external threads of the shank and the shank extension, and a friction means adapted to engage the shank extension and the threaded nut whereby reverse rotation of the nut to remove the nut from the shank rotates the shank extension for jamming the nut on the threaded shank.

The friction means may employ a nylon insert mounted on the nut threads or the shank extension, an adhesive such as locktite or simply a deflected thread, whereby the shank extension rotates upon reverse rotation of the nut.

BRIEF DESCRIPTION OF THE DRAWINGS

The preferred embodiment of the present invention will now be more fully described with reference to the accompanying drawings, in which:

FIG. 3 is a cross sectional view of the apparatus in a temporary mode, having a recess in the shank extension to receive a holding tool for easy removal of the nut.

FIG. 3A is a plan view of the embodiment shown in FIG. 3;

FIG. 5 is a view in cross section of the invention in a semi-permanent mode, in which on-site manipulation is required to remove the nut.

FIG. 5A is a plan view of the embodiment of the invention shown in FIG. 5;

FIG. 6 is a cross sectional view of the permanent mode of the invention whereby the enclosed nut prevents removal of said nut.

FIG. 6A is a plan view of the embodiment shown in FIG. 6;

DESCRIPTION OF THE PREFERRED EMBODIMENT

Figure 1:
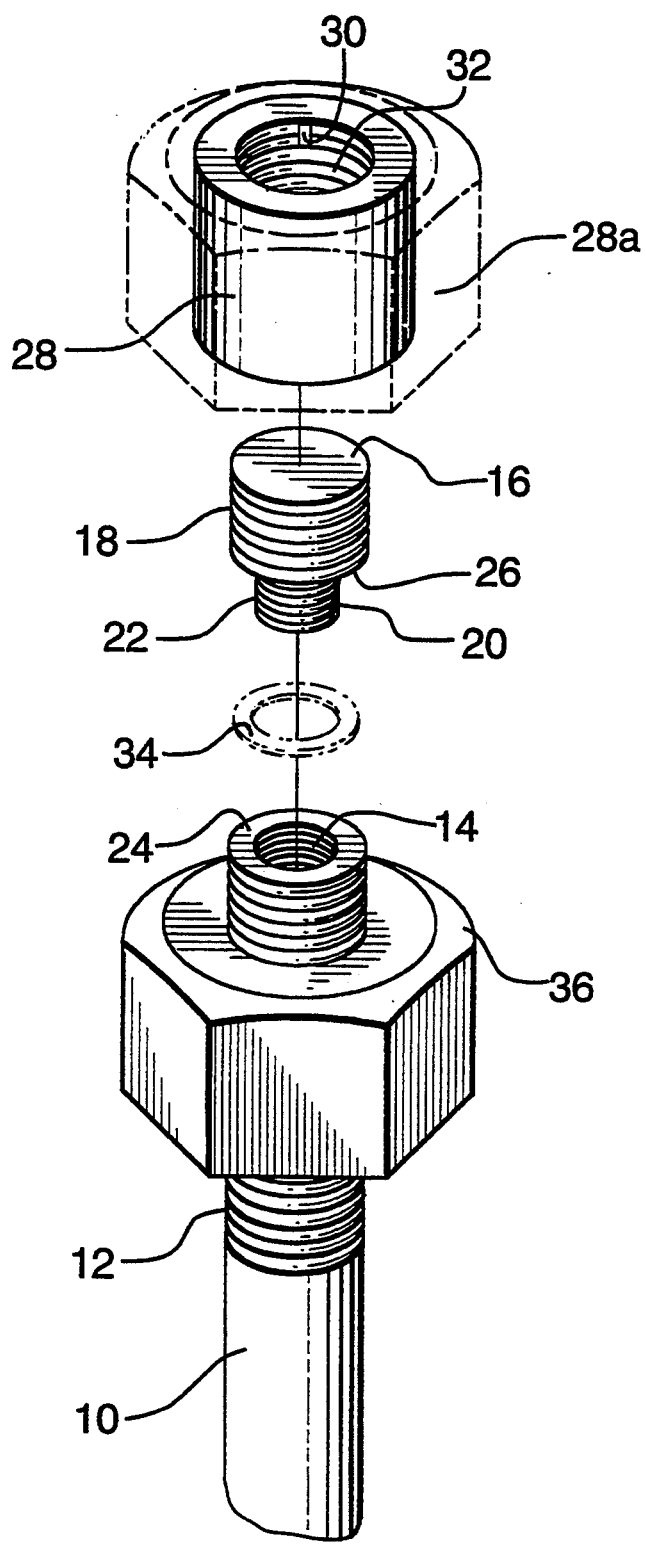
FIG. 1 is a isometric exploded view of the invention, employed to prevent the removal of a structural nut.

With reference to FIG. 1, there is provided a shank 10 having external threads 12 and a threaded coaxial bore 14 of different pitch but same direction, that is, both are right handed or both are left handed, as said external thread 12. A shank extension 16, having external threads 18 the same pitch and diameter as the external threads 12, has a threaded projection 20 having threads 22 adapted to engage the threaded bore 14. A nut 28 having threads adapted to engage the shank external threads 12 is of sufficient length to engage substantially all the shank extension threads and several threads of the threaded shank 10.

Figure 2:
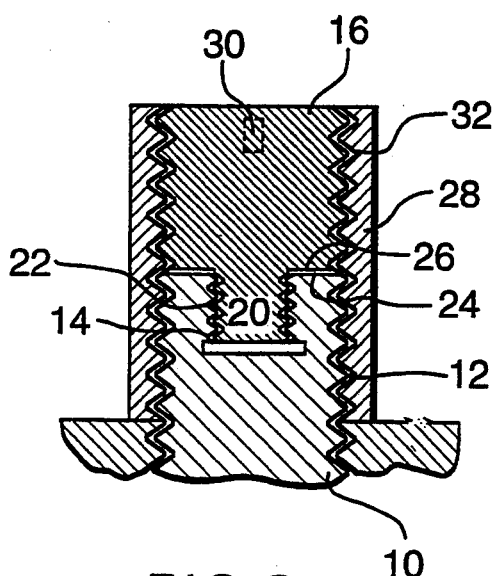
FIG. 2 is a cross sectional view of the lock nut apparatus fully assembled.

Now referring to FIG. 2, showing the apparatus of the invention assembled, the shoulder 26 of the shank extension 16 is in abutment with the shoulder 24 of the threaded shank 10. In this position the threads should be aligned to allow the internal threads 32 of the nut 28 to freely engage the external threads 12 of the shank 10 and external threads 18 of the shank extension 16 simultaneously. A nylon or teflon shim spacer 34, shown in ghost lines in FIG. 1, may be employed between shoulders 24 and 26 to reduce friction between the shoulder and to align threads if external threads 12 and 18 are not aligned as described previously.

A nylon insert 30 mounted on the internal threads 32 of the nut 28 in communication with the shank extension 16, provides a friction means between said nut 28 and shank extension 16. While threading the nut 28 onto the threaded shank 10 and shank extension 16, the said shank extension 16 is prevented from rotating by the abutment of the shank and shank extension shoulders 24 and 26 respectively, but upon attempting to remove the nut 28 by rotating in the reverse direction, friction created by the nylon insert 30 causes the shank extension 16 to rotate, creating a misalignment of the external threads of the shank and shank extension and jamming of the nut results. As the nut is forced harder it becomes more jammed. Removal of the nut can only be achieved if the shank extension 16 is prevented from rotating.

With reference to FIGS. 3, 3A, the cross sectional view shows the temporary or removable mode of the invention in combination with a bolt 40 having shank 10 passing through a pair of plates 40, 42 secured together by nut 36, in which the top of the shank extension 16 has a recess 38 adapted to receive a hex wrench or other similar tool to prevent reverse rotation while removing the nut.

Figure 4A:
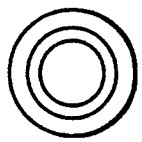
FIG. 4A–4D show plan view of embodiments of the invention for use with a screwdriver, hex wrench or the like tool.
Figure 4B:
Figure 4C:
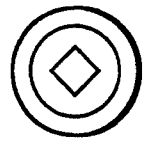
Figure 4D:
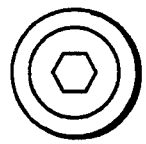

FIGS. 4A–4D shows various configurations which may be employed in the temporary mode; FIG. 4A showing a cylindrical bore, FIG. 4B showing double slotted recess, FIG. 4C showing a square recess, and FIG. 4D showing a hexagonal recess for receiving corresponding mating tools.

Referring to FIGS. 5, 5A, a cross sectional view of the semi-permanent mode shows a non-recessed shank extension requiring on site manipulation of the shank extension as well as a special tool to remove the nut.

FIGS. 6, 6A show a modified nut 50 having an enclosed top 52 to prevent access to the shank extension. In this permanent mode the nut cannot be removed, even with prior knowledge of the structure of the invention.

Figure 7:
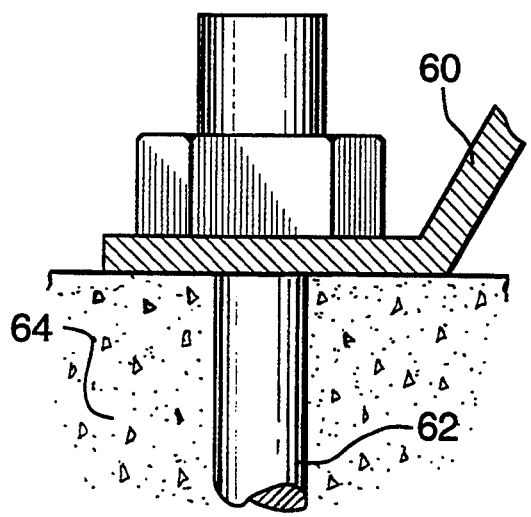
FIG. 7 shows the use of the present invention for securing a bracket to a bolt embedded in concrete.

FIG. 7 illustrates the securement of a bracket 60 to a bolt 62 embedded in concrete 64 by means of an embodiment of the invention.

Figure 8:
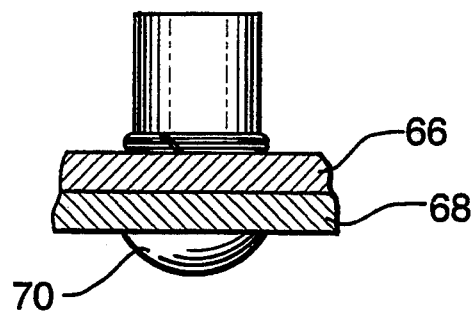
FIG. 8 shows the use of the present invention for securing a pair of plates together.

FIG. 8 shows the securement together of a pair of plates 66, 68 by means of a headed bolt 70 having an embodiment of the invention connected thereto.

The invention provides a number of important advantages. The construction and implementation of the apparatus is much simpler than prior art in that it is self activating and there are no reverse threads. Modifying the shank extension or the nut slightly provides different levels of difficulty for removal of the nut. As well the nut of the invention may be used to prevent a heavy structural nut from being removed, or may be used to support a structural load itself.

It will be understood that modifications can be made in the embodiment of the invention described herein without departing from the scope and purview of the invention as defined by the appended claims.

We claim:

1. An apparatus for locking a threaded nut onto a threaded shank comprising a threaded shank having an external screw thread of a first pitch and a threaded bore at one end of the threaded shank, coaxial with the external screw thread, having an internal screw thread of a second pitch, both the said external screw thread and the internal screw thread having a same direction of rotation, a shank extension having an external pitch of the first pitch and a threaded projection coaxial therewith of the second pitch adapted to engage the screw threaded bore of the shank, a threaded nut adapted to engage the external threads of the shank and the shank extension, and a friction means adapted to engage the shank extension and the threaded nut whereby reverse rotation of the nut to remove the nut from the shank rotates the shank extension for jamming the nut on the threaded shank.

2. An apparatus as claimed in claim 1 whereby the friction means is a nylon insert mounted on the internal threads of the nut.

3. An apparatus as claimed in claim 1 whereby the threaded nut has a cylindrical external wall.

4. An apparatus as claimed in claim 3 whereby the threaded nut has a closed top.

5. An apparatus as claimed in claim 1 whereby the threaded nut has a hexagonal external shape.

* * * * *